United States Patent [19]
Silverstein et al.

[11] Patent Number: 5,758,084
[45] Date of Patent: May 26, 1998

[54] APPARATUS FOR PARALLEL CLIENT/ SERVER COMMUNICATION HAVING DATA STRUCTURES WHICH STORED VALUES INDICATIVE OF CONNECTION STATE AND ADVANCING THE CONNECTION STATE OF ESTABLISHED CONNECTIONS

[75] Inventors: Alan Silverstein; William G. Golson; Munir Mallal, all of Ft. Collins, Colo.

[73] Assignee: Hewlett-Packard Company, Palo Alto, Calif.

[21] Appl. No.: 394,997

[22] Filed: Feb. 27, 1995

[51] Int. Cl.$^6$ ............................................. G06F 13/00
[52] U.S. Cl. ........................ 395/200.58; 395/200.33; 395/200.57; 395/200.6; 395/200.79; 340/825.79
[58] Field of Search ........................... 395/208, 680, 395/200.33, 200.45, 200.6, 395, 876

[56] References Cited

U.S. PATENT DOCUMENTS

| | | | |
|---|---|---|---|
| 4,982,187 | 1/1991 | Goldstein et al. | 340/825.79 |
| 5,218,680 | 6/1993 | Farrell et al. | 395/200.45 |
| 5,218,697 | 6/1993 | Chung | 395/200.6 |
| 5,226,159 | 7/1993 | Henson et al. | 395/650 |
| 5,257,369 | 10/1993 | Skeen et al. | 395/680 |
| 5,276,896 | 1/1994 | Rimmer et al. | 395/800 |
| 5,325,360 | 6/1994 | Friedrich | 370/85.5 |
| 5,355,453 | 10/1994 | Row et al. | 395/364 |
| 5,359,598 | 10/1994 | Steagall et al. | 370/58.1 |
| 5,390,328 | 2/1995 | Frey et al. | 395/650 |
| 5,392,400 | 2/1995 | Berkowitz et al. | 395/200.33 |
| 5,434,775 | 7/1995 | Sims et al. | 395/208 |
| 5,434,974 | 7/1995 | Loucks et al. | 395/700 |
| 5,452,454 | 9/1995 | Basu | 395/700 |
| 5,465,351 | 11/1995 | Lemmo | 395/200.01 |
| 5,606,719 | 2/1997 | Nichols et al. | 395/876 |
| 5,664,138 | 9/1997 | Yoshida | 395/395 |

FOREIGN PATENT DOCUMENTS

| | | |
|---|---|---|
| 0 467 546 A2 | 6/1991 | European Pat. Off. ........... G06F 9/46 |
| 1 501 754 | 2/1978 | United Kingdom . |
| WO 95/00905 | 1/1995 | WIPO . |

OTHER PUBLICATIONS

Dialog record 01362725 of Shaw R H, Microsoft Systems Journal, vol. 5, No. 3, p.81(8) N.b second to fifth papges.

*Primary Examiner*—Thomas C. Lee
*Assistant Examiner*—Po C. Huang

[57] ABSTRACT

A method and apparatus establishes and manages a connection between a computer client system and each of a plurality of server computer systems in parallel. The method includes the steps of (a) providing a plurality of server system data structures, each of the plurality of server system data structures being associated with one of the plurality of server computer systems and having a status indicator that stores a value indicative of a connection state existing between the client computer system and the associated one of the plurality of server computer systems; (b) attempting, for each of the plurality of server system data structures having a status indicator that stores a value indicative of no connection, to establish a connection between the client computer system and the associated one of the plurality of server computer systems; and (c) attempting, for each of the plurality of server system data structures, to advance the connection state between the client computer system and the associated one of the plurality of server computer systems, and updating the status indicator if the connection state between the client computer system and the associated one of the plurality of server computer systems is advanced.

26 Claims, 21 Drawing Sheets

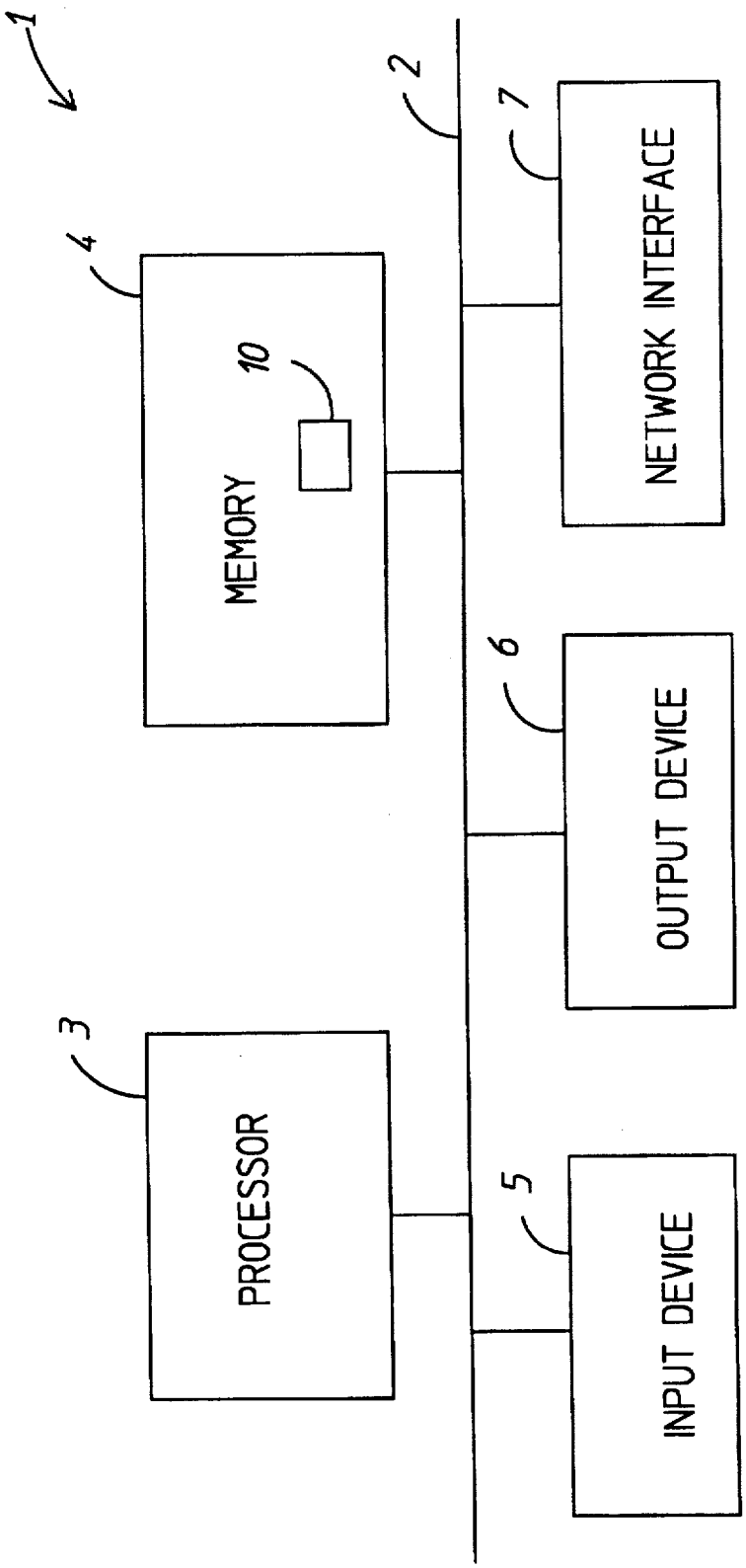

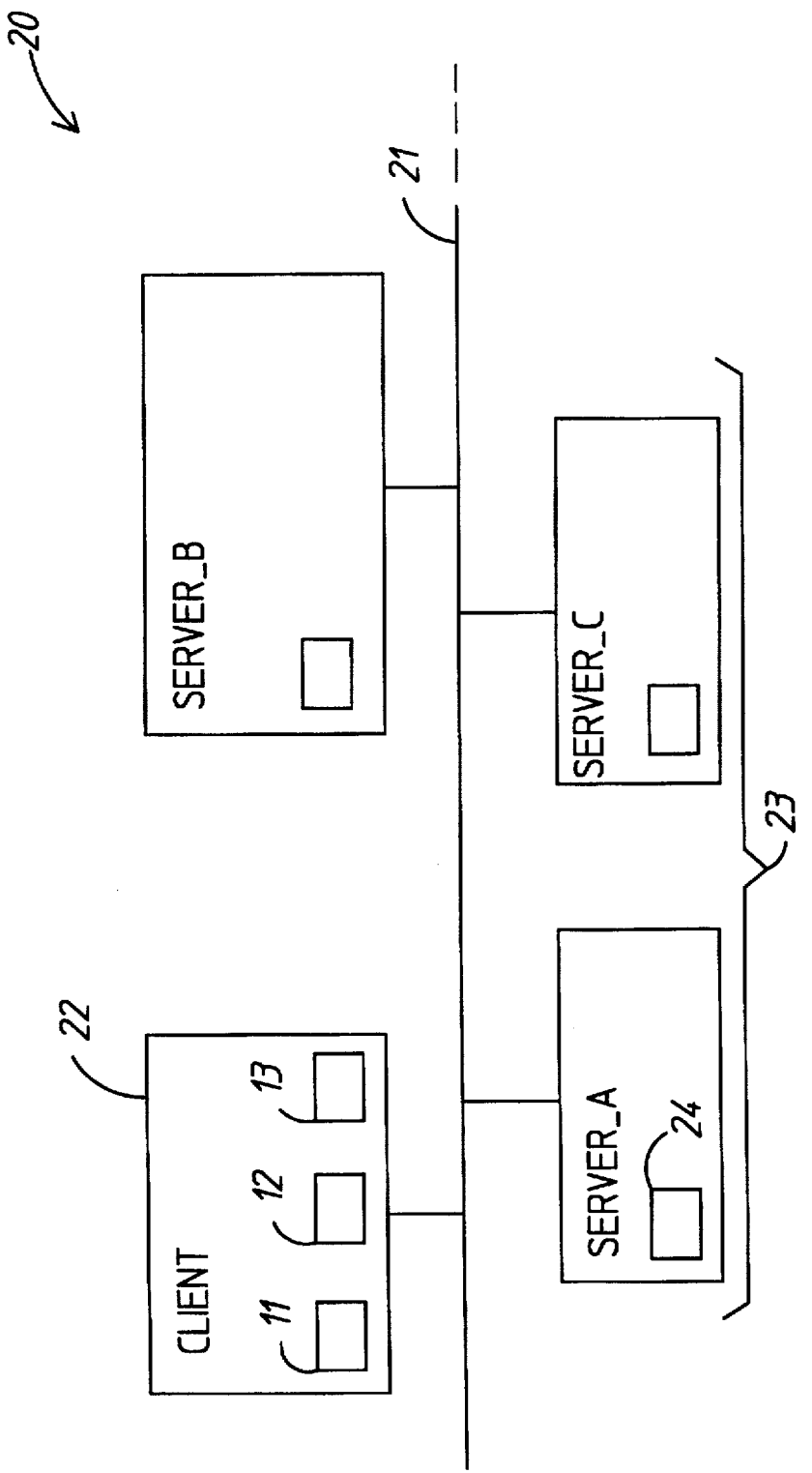

```
server_structure {

31  char *server_identifier;    /* pointer to server name         */
                                /* or address                     */
32  int status;                 /* connection status between      */
                                /* the client and server          */
33  time_t timeout_clock;       /* to determine time between      */
                                /* status changes                 */
34  char *port_or_command;      /* pointer to port or remote      */
                                /* command                        */
35  FILE *fp1;                  /* file pointer to the data       */
                                /* stream                         */
36  FILE *fp2;                  /* file pointer to the error      */ (optional)
                                /* stream                         */ (optional)
37  int close_flag;             /* close connection between       */
                                /* the client and the server      */
```

FIG 3

```
switch(status) {

CONNECT_1:                ─── 110
        connect1_routine();
        break;

READ_WAIT:                ─── 114
        read_wait_routine();
        break;

READ_READY:               ─── 115
        read_ready_routine();
        break;
```

FIG 14

```
switch(status) {
    CONNECT_1:
        connect1_routine();      — 111
        break;

CONNECT_2:
        connect2_routine();      — 112
        break;

CONNECT_3:
        connect3_routine();      — 113
        break;

READ_WAIT:
        read_wait_routine();     — 114
        break;

READ_READY:
        read_ready_routine();    — 115
        break;
```

FIG 15

APPARATUS FOR PARALLEL CLIENT/SERVER COMMUNICATION HAVING DATA STRUCTURES WHICH STORED VALUES INDICATIVE OF CONNECTION STATE AND ADVANCING THE CONNECTION STATE OF ESTABLISHED CONNECTIONS

FIELD OF THE INVENTION

The present invention relates to computer systems that communicate with other computer systems, and more particularly, to methods and apparatus for establishing and managing connections between a client system and selected server systems in parallel.

BACKGROUND OF THE INVENTION

Most computer systems have the ability to communicate through a computer network with another computer system. Often, a client system (or client) communicates with a server system (or server) by establishing what is called a connection between the client and the server. A connection is a mechanism that enables the transmission of data between two endpoints, one endpoint at the client and one at the server. "The Design and Implementation of the 4.3BSD UNIX Operating System" by Leffler (1989) provides detailed explanations of how to make and use a connection between a client and a server.

Both the client and the server run a specialized program to establish and manage the connection. These specialized programs typically require the use of several complex routines. For instance, UNIX programmers use routines such as socket( ), connect( ) and select( ) to prepare the client, to initiate the connection, and to monitor the status of the connection. A drawback is that the programmer is burdened with having to use more than one routine to establish and manage the connection mechanism when writing a program for the client.

Nevertheless, a connection is a useful mechanism for communication between a client and a server. For instance, when sending electronic mail from a client to a server, the client (1) establishes a connection to the server, (2) tells the server to expect a letter through the connection, (3) sends the letter to the server through the connection, and (4) receives back confirmation from the server that the letter was received through the connection.

UNIX provides a routine called rcmd( ) that solves the problem of running a remote command by using a connection. A programmer uses the rcmd( ) routine in the calling program to execute a command remotely on a server. The rcmd( ) routine sends the remote command to the server through the connection. Then, the rcmd( ) routine waits (or blocks) until the rcmd( ) routine detects a response from the server. The rcmd( ) routine automatically handles connection establishment so that the programmer is not burdened with having to use routines such as socket( ), bind( ), and connect( ) directly. After the rcmd( ) routine establishes the connection, the calling program may need to invoke select( ) to manage the conversation, i.e., to manage the data received from the server.

The server uses an inetd daemon to respond to the rcmd( ) routine of the client. A daemon is a process that provides a system-related service, the system-related service in this case being the server's response to the rcmd( ) routine, resulting in the server sending an indication back to the client that the command has been executed. In particular, the inetd daemon starts a remshd daemon which, according to an established protocol (herein called the remsh protocol for simplicity), receives the remote command from the client, runs the remote command, and returns a null byte to the client.

However, the rcmd( ) routine has several drawbacks. First, once the calling program invokes the rcmd( ) routine, the calling program must wait until the rcmd( ) routine completes the entire remote command invocation operation. That is, the rcmd( ) routine operates as an atomic (i.e., non-dividable) step of (1) establishing a connection to the server, (2) sending the remote command to the server, (3) blocking (i.e., waiting) to allow the server to respond, and (4) receiving a null byte from the server. The atomicity of the rcmd( ) routine may be an inconvenience to the calling program. In particular, the calling program's response time is increased by having to wait for the rcmd( ) routine to complete.

Secondly, the rcmd( ) routine performs "retry" operations until the rcmd( ) routine receives the null byte or until a fixed number of retries are performed (i.e., a timeout condition occurs). In particular, if the server is unavailable, the rcmd( ) routine will nevertheless try a total of five times to (1) establish a connection, (2) send the remote command, and (3) wait to receive a response before providing an error indication. This operation blocks the calling program for about 30 seconds. Accordingly, use of the rcmd( ) routine makes the performance of the calling program very sensitive to connection problems.

Thirdly, the rcmd( ) routine creates a new connection each time it is invoked. Accordingly, each time the calling program invokes the rcmd( ) routine to execute a remote command on a particular client, resources are consumed by both the client and the server to create and maintain a new connection.

Additionally, the rcmd( ) routine does not support parallelization of communication, i.e., a programmer cannot use the rcmd( ) routine to establish connections to more than one server and send the remote command to each server simultaneously. Accordingly, if the programmer wishes to execute a remote command on more than one server, the programmer must serially invoke the rcmd( ) routine again and again for each server or fork a new process to communicate with each server, which is resource expensive. It should be clear that multiple 30 second timeouts caused by network problems, for example, may exacerbate the problems of a poorly performing calling program.

Alternatively, if the programmer wishes to establish and manage connections with multiple servers simultaneously by using the connection routines such as connect( ) and select( ) directly, the programmer is inconvenienced by having to invest additional time and effort into developing code that coordinates and distinguishes the establishment and management of a connection between the client and each server.

Accordingly, a need exists for a tool that enables a programmer to conveniently and effectively establish and manage connections between a client and more than one server in parallel. Additionally, there exists a need for a mechanism that allows a client to execute remote commands on a server that overcomes the drawbacks of the rcmd( ) routine outlined above.

SUMMARY OF THE INVENTION

A first aspect of the invention is directed to a method for establishing and managing a connection between a client computer system and each of a plurality of server computer systems. The method includes the steps of (a) providing a plurality of server system data structures, each of the plurality of server system data structures being associated with one of the plurality of server computer systems and having a status indicator that stores a value indicative of a connection state existing between the client computer system and the associated one of the plurality of server computer systems; (b) attempting, for each of the plurality of server system data structures having a status indicator that stores a value indicative of no connection, to establish a connection between the client computer system and the associated one of the plurality of server computer systems; and (c) attempting, for each of the plurality of server system data structures, to advance the connection state between the client computer system and the associated one of the plurality of server computer systems, and updating the status indicator if the connection state between the client computer system and the associated one of the plurality of server computer systems is advanced.

Another aspect of the invention is directed to a method for establishing and managing a connection between a client computer system and a server computer system. The method includes the steps of (a) providing a server system data structure having a status indicator that stores a value indicative of a connection state existing between the client computer system and the server computer system; (b) attempting to establish a connection between the client computer system and the server computer system when the status indicator stores a value indicative of no connection; and (c) attempting to advance the connection state between the client computer system and the server computer system, and updating the status indicator if the connection state between the client computer system and the server computer system is advanced.

Another aspect of the invention is directed to an apparatus for establishing and managing a connection to each of a plurality of server computer systems in a computer network. The apparatus includes an electronic digital computer including a processor, a memory and a network interface. The computer functions as a client computer system. The computer includes means for providing a plurality of server system data structures, each of the plurality of server system data structures being associated with one of the plurality of server computer systems and having a status indicator that stores a value indicative of a connection state between the client computer system and the associated one of the plurality of server computer systems. The client computer system further includes means for attempting, for each of the plurality of server system data structures having a status indicator that stores a value indicative of no connection, to establish a connection between the client computer system and the associated one of the plurality of server computer systems. The client computer system additionally includes means for attempting, for each of the plurality of server system data structures, to advance the connection state between the client computer system and the associated one of the plurality of server computer systems, and updating the status indicator if the connection state between the client computer system and the associated one of the plurality of server computer systems is advanced.

Another aspect of the invention is directed to an apparatus for establishing and managing a connection between a client computer system a server computer system in a computer network. The apparatus includes an electronic digital computer including a processor, a memory, and a network interface. The computer functions as a client computer system. The client computer system includes means for providing a server system data structure having a status indicator that stores a value indicative of a connection state existing between the client computer system and the server computer system. The client computer system further includes means for attempting to establish a connection between the client computer system and the server computer system when the status indicator stores a value indicative of no connection. The client computer system additionally includes means for attempting to advance the connection state between the client computer system and the server computer system, and updating the status indicator if the connection state between the client computer system and the server computer system is advanced.

BRIEF DESCRIPTION OF THE DRAWINGS

In the drawings,

FIG. 1 is a block diagram of a computer system suitable for implementing the invention;

FIG. 2 is a block diagram of a computer network suitable for implementing the invention;

FIG. 3 is a diagram of a server data structure according to an embodiment of the invention;

FIG. 14 is a switch implementation of the "get selection result" step of FIG. 11 according to the first embodiment of the invention;

FIG. 15 is a switch statement implementation of the "get selection result" step of FIG. 11 according to the second embodiment of the invention;

DETAILED DESCRIPTION

Figure 4:
FIG. 4 is an array of server data structures according to an embodiment of the invention.

The present invention will be more completely understood through the following detailed description which should be read in conjunction with the attached drawings in which similar reference numbers indicate similar structures. All references cited herein are hereby expressly incorporated by reference.

The invention utilizes a computer 1 such as shown in FIG. 1. The computer 1 may take the form of a personal computer, a lap-top computer, a computerized notebook, a workstation, a mainframe computer, a supercomputer, a multiprocessing computer, or a distributed computer network, all of which are intended to be within the scope of the invention. The computer 1 is representative of both a client system (or client) and a server system (or server).

The computer 1 includes a general system bus 2 which connects a processor 3 with a memory 4, an input device 5, an output device 6, and a network interface 7. The memory 4 includes both primary memory which provides fast access time and is typically in the form of semiconductor memory, and secondary memory which provides slower access time and is typically in the form of a magnetic disk or tape which retains data if power to the computer 1 is lost. The input device 5 is preferably a keyboard but may take the form of a mouse, a scanner, a microphone, an antenna or any combination thereof. The output device 6 is preferably a video display but may take the form of a printer, a speaker, an antenna or any combination thereof. An exemplary computer of the invention is the HP9000 Model 710 with display A1097C which is sold by Hewlett-Packard. Although other configurations of computer components are contemplated and are intended to be within the scope of the invention, further details of the invention will be discussed in terms of the computer 1 shown in FIG. 1 for ease of explanation.

The computer 1 includes an operating system 10 that manages the allocation of computer resources including computer time, memory space and access to a computer network. Additionally, the invention includes a prcmd( ) facility 11 (referred to hereinafter as the prcmd( ) routine). In a first embodiment, prcmd( ) routine 11 establishes a connection with a customized daemon on each server and moderates conversations between the client and each daemon. In a second embodiment, the prcmd( ) routine 11 also encapsulates the remsh protocol, and runs a remote command on each server with which a client carries on a conversation moderated by the prcmd( ) routine 11. Preferably, the prcmd( ) routine 11 is a library routine. However, the prcmd( ) routine 11 may also take the form of an interactive user command or a system call both of which are intended to be within the scope of the invention. Both the operating system 10 and the prcmd( ) routine 11 are stored in the memory 4.

The prcmd( ) routine 11 allows a networked application program 12 (i.e., a calling program) to efficiently connect to a large number of remote systems (i.e., servers) in parallel. This permits the calling program 12 to carry on a relatively arbitrary conversation with each of the remote systems. In the second embodiment, the prcmd( ) routine 11 implements the client side of the standard remsh protocol which enables the prcmd( ) routine 11 to interact with inetd and remsh daemons running on the remote servers. Use of the inetd and remsh daemons on the remote servers alleviates the need for the user to write a daemon for responding to the prcmd( ) routine 11 on the server-side. Nevertheless, the user may choose to write a customized server-side daemon to handle specific operations.

FIG. 2 shows a block diagram of a suitable environment 20 for the invention. The environment 20 is a computer network including a network bus 21 which connects the client 22 with one or more servers 23. The network bus 21 may include any of a variety of topologies and any of a number of communications media such as ethernet, twisted pair or RF. The computer 1 is a suitable device for the client 22. The prcmd( ) routine 11 and the calling program 12 are shown as residing in the client 22. Additionally, the computer 1 is a suitable device for each of the one or more servers 23. Each of the one or more servers 23 must include a server daemon 24 that responds to requests from the prcmd( ) routine 11 received through the network bus 21 from the client 22.

FIG. 3 shows a server structure 30 utilized by the prcmd( ) routine 11. The server structure 30 is a data structure that is stored in the memory 4. The calling program must ensure that a server structure 30 exists for each server to be connected with before invoking the prcmd( ) routine 11. One way to ensure the existence of a server structure 30 for each server to be connected with is for the calling program to create and initialize each server structure 30 to form an array of structures 40 as shown in FIG. 4. After creating the array of structures 40, wherein each element of the array is associated with one of the servers 23, the calling program 12 must initialize various fields of each server structure 30. In particular, the server_identifier 31 is a pointer that points to either the server system node name or the server internet address of one of the servers 23. The status variable 32 must be initialized to the "NO_CONNECTION" state to indicate that no connection currently exists between the client 22 and the server 23. Additionally, in the first embodiment the port_or_command pointer 34 points to a port number through which to connect to the server 23. In the second embodiment, the port_or_command pointer 34 points to a remote command to be sent to the server 23. The timeout_clock 33 and the file pointer fp1 35 are initialized by the prcmd( ) routine 11. Optionally, the server structure 30 may also include a second file pointer fp2 36 and a close_flag 37 which will be discussed later.

Figure 5:
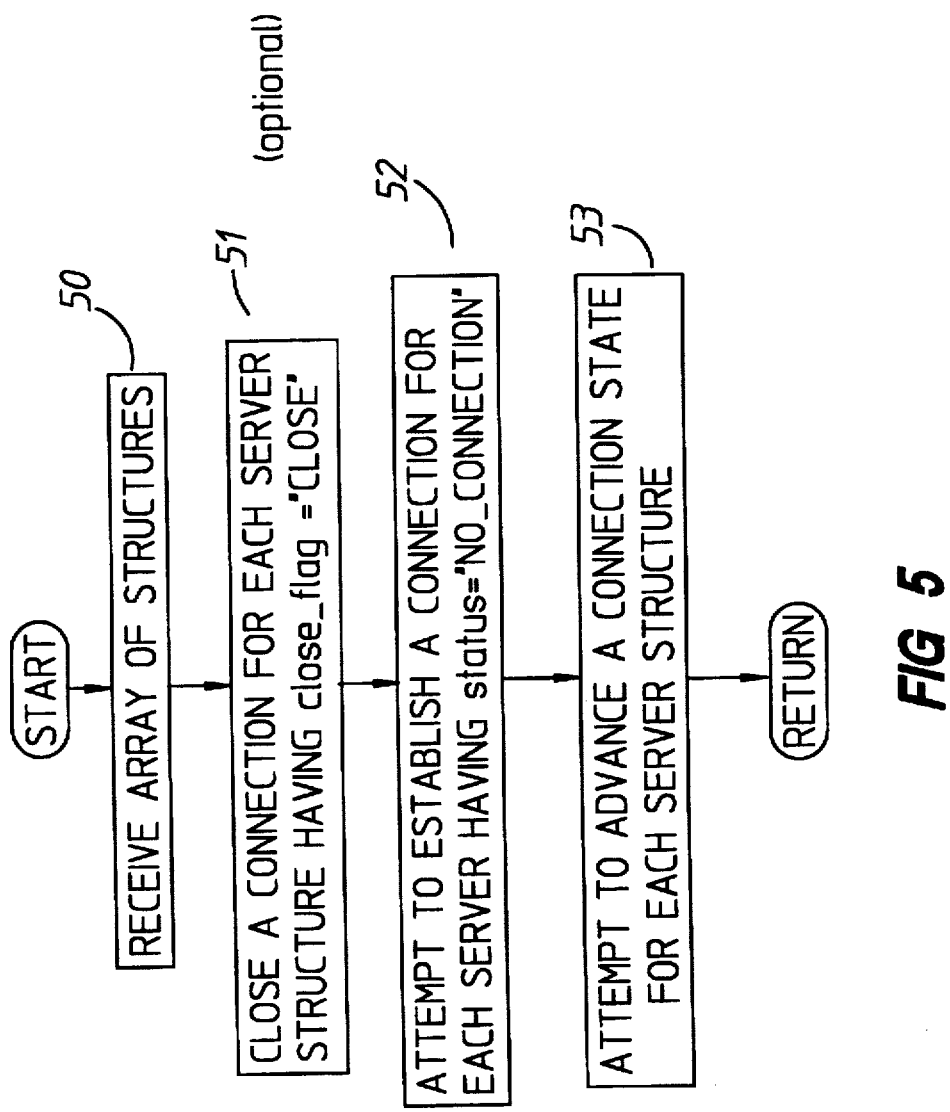
FIG. 5 is a flow diagram of a prcmd( ) routine according to an embodiment of the invention.

The operation of the prcmd( ) routine 11 is shown in FIG. 5 and will now be described. The calling program initializes the array of structures 40. Then, the calling program calls the prcmd( ) routine 11 repeatedly to advance connection states that exist between the client 22 and each of the one or more servers 23, until all the connections either fail or are closed. When the calling program 12 invokes the prcmd( ) routine 11, the prcmd( ) routine 11 (1) receives the array of structures 40 from the calling program (step 50), (2) attempts to establish a connection for each server having status equal to the "NO_CONNECTION" state (step 52), and (3) attempts to advance a connection state for each server structure (step 53). The connection states differ for the different embodiments and are enumerated below. Note that the connection state for each server may advance at an independent rate.

Step 50 refers to the calling program 12 passing a pointer to the array of structures 40 as a parameter to the prcmd( ) routine 11. The prcmd( ) routine 11 uses the pointer to the array of structures as a reference point that indicates the beginning of the array of structures 40. The prcmd( ) routine 11 may access each server structure 30 of the array of the structures 40 by accessing a location in memory that equals the pointer to the array of structures plus N times the size of a server structure, wherein N equals an integer greater than or equal to zero (i.e., N=0, 1, 2, . . .). Step 52 involves the prcmd( ) routine 11 attempting to establish a connection for each of the one or more servers 23 having an associated server structure 30 with the status variable equal to the "NO_CONNECTION" state. Step 53 involves the prcmd( ) routine 11 attempting to advance the connection state between the client 22 and each of the one or more servers 23, i.e., each server structure 30 of the array of structures 40. Accordingly, each time it is called, the prcmd( ) routine 11 attempts to establish a connection with each server before attempting to advance any of the connection states between the client 22 and the one or more servers 23. Hence, the prcmd( ) routine 11 handles the establishment and maintenance of connections in parallel.

The operation of the prcmd( ) routine 11, as described above, overcomes the drawbacks of the rcmd( ) routine. In particular, the calling program 12 does not have to wait for the remote command operations on each server to complete. Rather, the prcmd( ) routine 11 returns after incrementally attempting to advance the connection state between the client 22 and each of the one or more servers 23. Preferably, the prcmd( ) routine 11 uses nonblocking system calls so that the operating time of each invocation of the prcmd( ) routine 11 is minimized. Secondly, the performance of the calling program 12 is no longer extremely sensitive to connection problems since the prcmd( ) routine 11 will not block the calling program to perform a retry operation. Thirdly, a user may write a customized server-side program for each of the one or more servers 23 to interact with the prcmd( ) routine 11 so that connections between the client 22 and each of the one or more servers 23 is maintained and reused. This enables the calling program 12 to consume less connection resources on the client 22 since a new connection will not need to be created each time the client converses with the server.

Optionally, the prcmd( ) routine 11 permits the calling program 12 to instruct the prcmd( ) routine 11 to close any previously existing connections between the client 22 and each of the one or more servers 23. This option requires that each server structure 30 include a close_flag variable. Each of the close_flag variables 37 of the array of structures 40 must be initialized to the "DO_NOT_CLOSE" state. If the calling program 12 wishes to close a connection between the client 22 and a server, the calling program must set the close_flag 37 of the server structure 30 associated with the server to the "CLOSE" state. Step 51 shown in FIG. 5 closes a connection between the client 22 and each of the one or more servers 23 having the close_flag equal to the "CLOSE" state.

Figure 6:
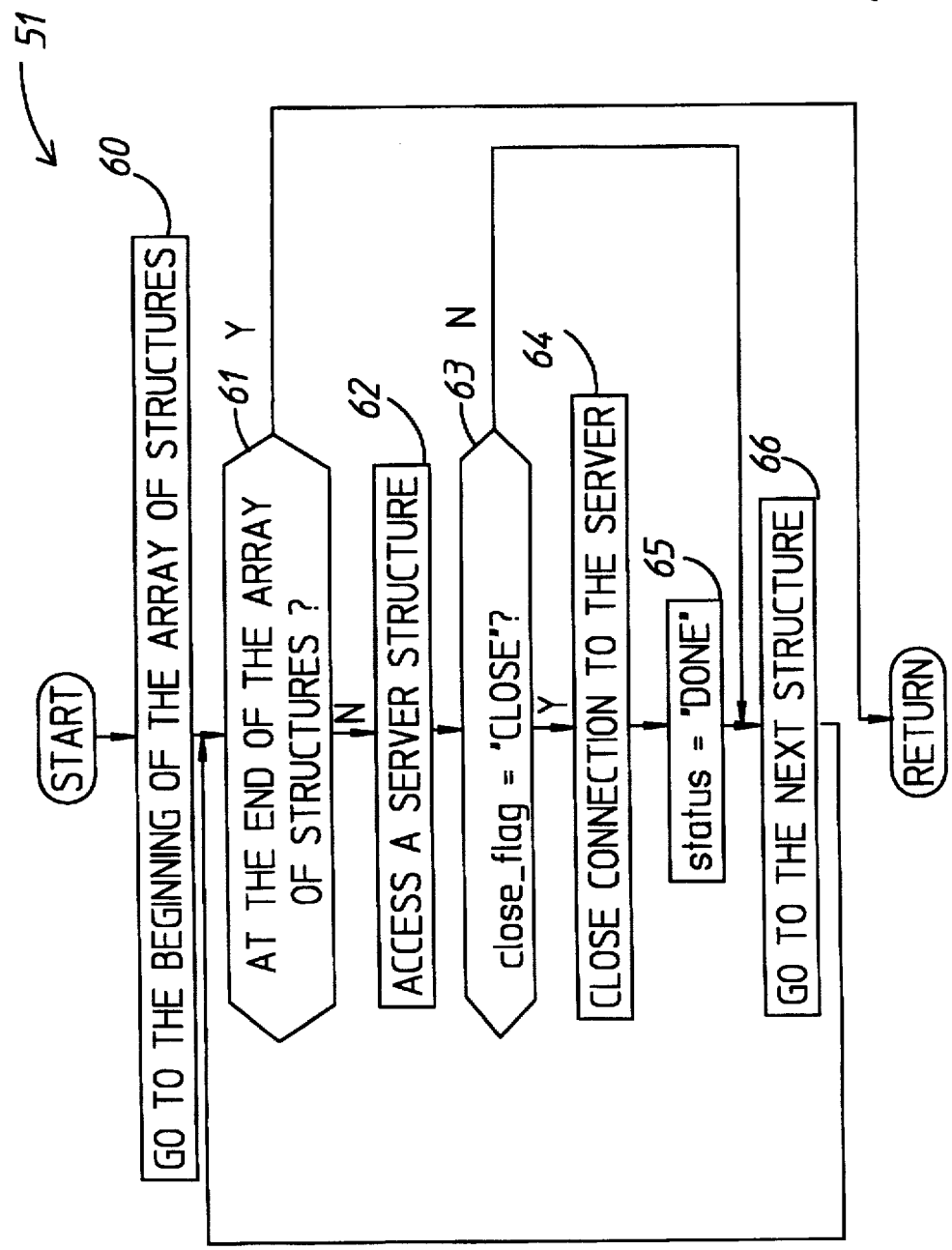
FIG. 6 is a flow diagram of the "close a connection" step in FIG. 5 according to an embodiment of the invention.

FIG. 6 shows step 51 (FIG. 5) in more detail. Step 60 involves the prcmd( ) routine 11 going to the beginning of the array of structures 40. Step 61 determines whether the prcmd( ) routine 11 is at the end of the array of structures 40. If the prcmd( ) routine 11 is not at the end of the array of structures 40, step 61 proceeds to step 62 which accesses a server structure 30 from the array of structures 40. Step 63 determines whether the close_flag 37 of the server structure 30 equals the "CLOSE" state. If the close flag 37 equals the "CLOSE" state, step 63 proceeds to step 64 which closes the connection to the server identified by the server_identifier pointer 31 of the server structure. Step 65 sets the status variable 32 of the server structure 30 to the "DONE" state. Step 66 directs the prcmd( routine 11 to the next server structure 30 of the array of server structures 40. If the close_flag 37 does not equal the "CLOSE" state, i.e., the close_flag 37 equals the "DO_NOT_CLOSE" state, the prcmd( ) routine 11 skips steps 64 and 65 and proceeds directly to step 66. When step 61 determines that the prcmd( ) routine 11 is at the end of the array of structures (step 61), step 51 returns, and the prcmd( ) routine 11 proceeds to step 52 as shown in FIG. 5.

Any loop statement is suitable for step 51. For example, in C the loop may be implemented using a for-loop, a while-loop, or a do-while-loop.

Figure 7:
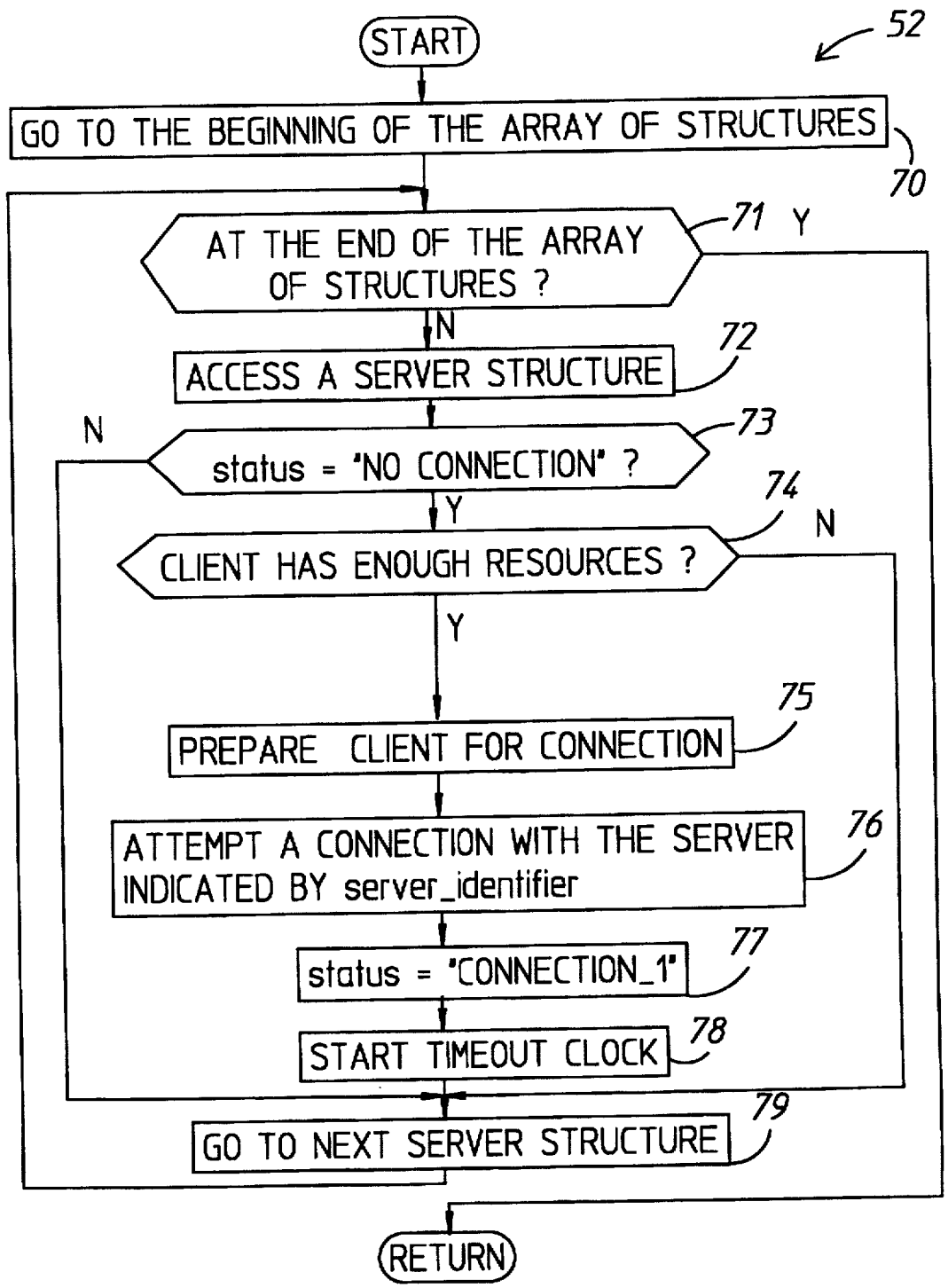
FIG. 7 is a flow diagram of the "attempt to establish a connection" step of FIG. 5 according to an embodiment of the invention.

FIG. 7 provides a flow diagram of step 52 (FIG. 5) which will now be discussed in further detail. Step 70 directs the prcmd( ) routine 11 to the beginning of the array of structures 40. Step 71 determines whether the prcmd( ) routine 11 is at the end of the array of structures 40. If the prcmd( ) routine 11 is not at the end of array structures 40, step 71 proceeds to step 72, which accesses a server structure 30 from the array of structures 40. Step 73 determines whether the accessed server structure 30 has a status variable 32 equal to the "NO_CONNECTION" state. If the status variable 32 does not equal the "NO_CONNECTION" state, step 73 proceeds to step 79. If the status variable 32 equals "NO_CONNECTION", step 73 proceeds to step 74. Step 74 determines whether the client 22 has enough resources to establish another connection. For instance, the client 22 may be without an available reserved port number (as will be discussed later), thereby preventing the client 22 from establishing a connection with the server identified by the server_identifier 31 of the accessed server structure 30. If the client 22 has enough resources, step 74 proceeds to step 75 which prepares the client 22 for the connection. Step 76 involves the prcmd( ) routine 11 attempting a connection with the identified server. In the first embodiment, this involves making a connection to the port number specified by the port_or_command 34. In the second embodiment, this involves making a connection to the standard port number for the remsh service. Step 77 sets the status variable 32 to equal "CONNECTION_1" state. Step 78 starts a timeout_clock 33 for the server identified by the server structure 30. Step 79 directs the prcmd( ) routine 11 to the next server structure 30 in the array of structures 40. When step 71 determines that the prcmd( ) routine 11 is at the end of the array of structures 40, step 71 causes step 52 to return so that the prcmd( ) routine 11 may proceed to step 53.

Step 76 (see FIG. 7) may utilize the connect( ) routine to initiate the connection between the client 22 and the server. Although step 76 may use a blocking connect( ), a nonblocking connect( ) is preferred to improve the performance of the prcmd( ) routine 11.

Figure 8:
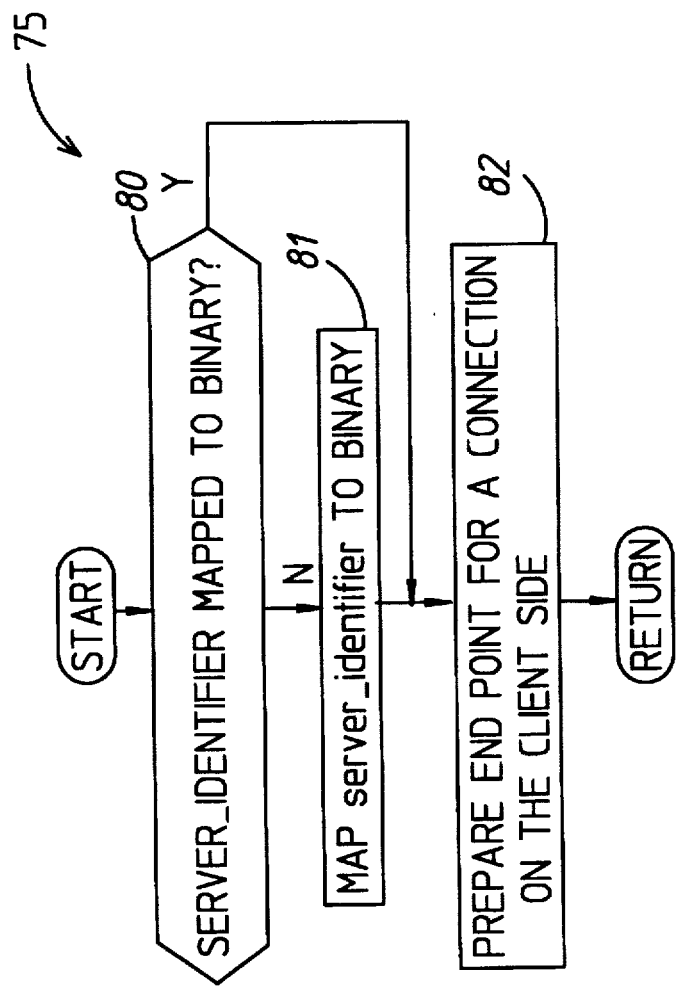
FIG. 8 is a flow diagram of the "prepare client for connection" step of FIG. 7 according to an embodiment of the invention.

FIG. 8 shows further details of step 75 (FIG. 7) which will now be discussed. The prcmd( ) routine 11 establishes connections with each of the one or more servers 23 using a binary network address for each server. Step 80 determines whether the server identifier 31 of the server structure 30 has been mapped (i.e., converted) to the binary network address. If the server identifier 31 has not been mapped, step 80 proceeds to step 81. Otherwise, step 80 proceeds to step 82. Step 81 maps the server identifier 31 to binary. Step 82 prepares a client-side endpoint for one end of the connection between the client 22 and the server.

Figure 9:
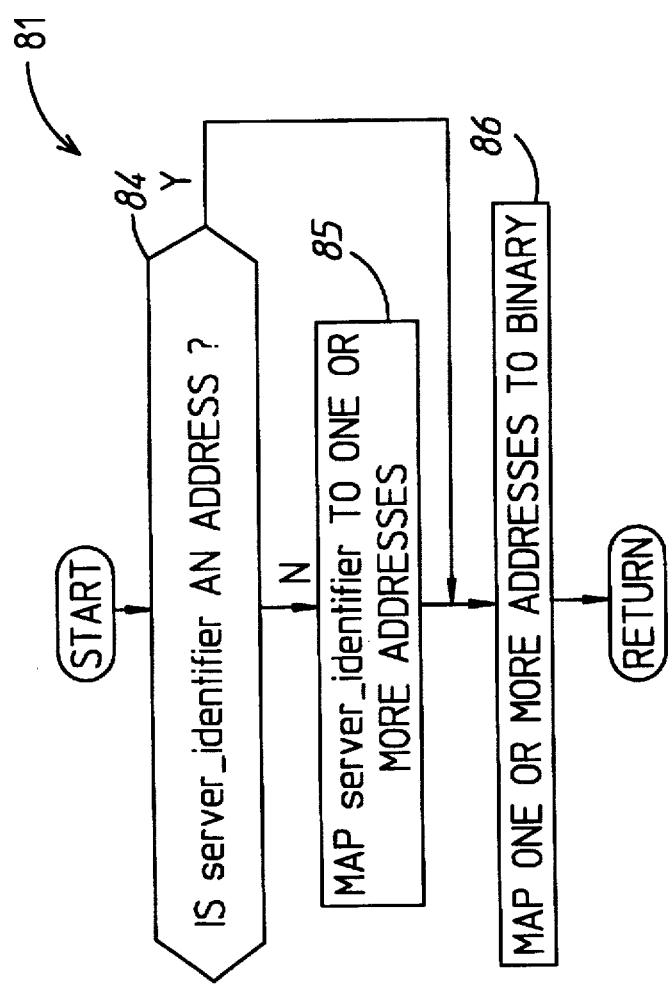
FIG. 9 is a flow diagram of the "map server_identifier to binary" Step of FIG. 8 according to an embodiment of the invention.

FIG. 9 shows further details of step 81 (FIG. 8) which will now be discussed. Step 84 determines whether the server identifier 31 of the server structure 30 is an address. If the server identifier 31 is an address, step 84 proceeds to step 86. If the server_identifier 31 is not an address, step 84 proceeds to step 85, which maps the server identifier to one or more addresses, wherein each address identifies the server. Step 86 maps the one or more addresses to binary for use by the client 22 to establish a connection with the server.

Figure 10:
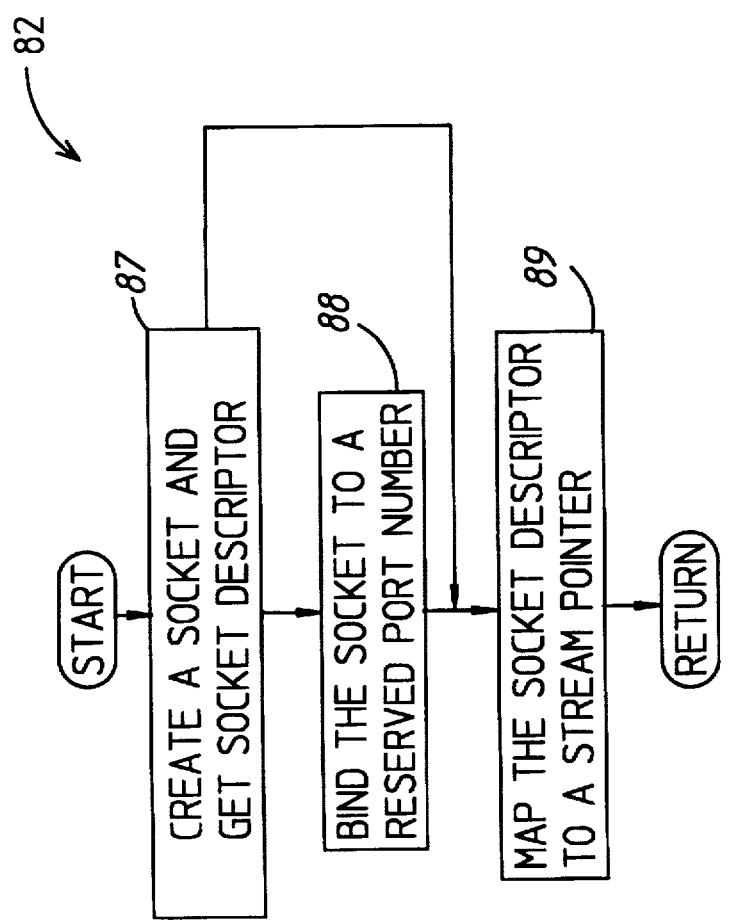
FIG. 10 is a flow diagram of the "prepare end point" step of FIG. 8 according to an embodiment of the invention.

FIG. 10 shows further details of step 82 (FIG. 8) which will now be discussed. Step 87 creates a socket and stores a socket descriptor for the connection between the client 22 and the server. Step 88 binds the socket to a reserved port number. Recall that step 74 determined that port numbers are available. Preferably, the allocation of resources (step 75), and the check for sufficient resources (step 74) occur simultaneously to avoid race conditions. Step 89 maps the stored socket descriptor of step 87 to a stream pointer which is stored in the file pointer fp1 35 of the server structure 30. The calling program 12 may read from the data stream (e.g., the results of the remote command from the server), and send data to the remote command or custom daemon using the file pointer fp1 35. The prcmd( ) routine 11 may utilize the socket( ), bind( ) and fdopen( ) routines for steps 87, 88 and 89, respectively, so that the calling program 12 need not bother with these tasks.

Figure 11:
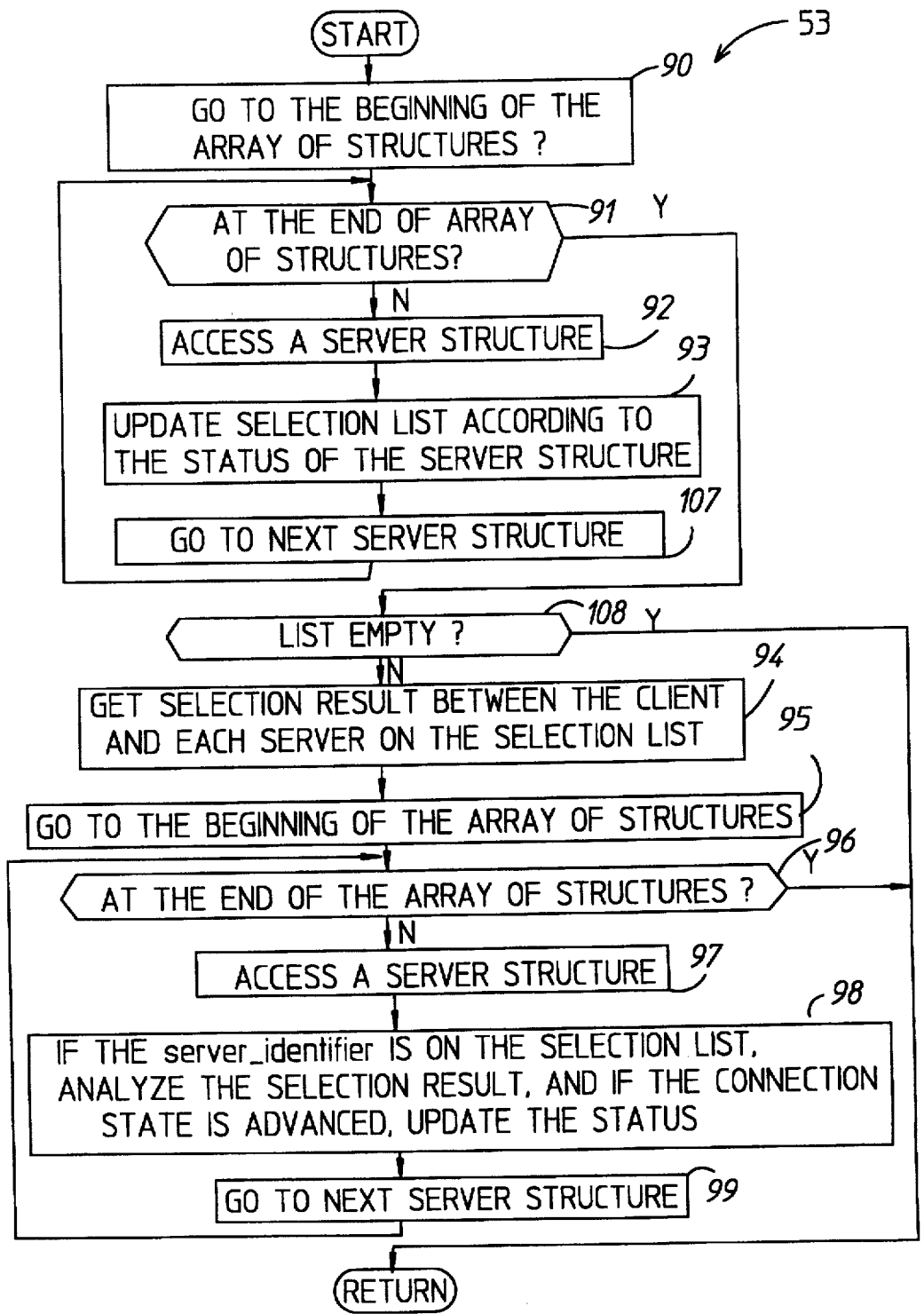
FIG. 11 is a flow diagram of the "attempt to advance a connection state" step of FIG. 5 according to an embodiment of the invention.

FIG. 11 provides further details of step 53 (FIG. 5) which will now be discussed. Step 90 directs the prcmd( ) routine 11 to the beginning of the array of structures 40. Step 91 determines whether the prcmd( ) routine 11 is at the end of the array of structures 40. If not, step 91 proceeds to step 92, which accesses a server structure 30 of the array of structures 40. Step 93 involves updating a selection list 13 according to the status 32 of the server structure 30. Step 107 goes to the next server structure 30 in the array of structures 40. When step 91 determines that the prcmd( ) routine 11 is at the end of the array of structures 40, step 91 proceeds to step 108. Step 108 determines whether the selection list is empty. If so, step 108 causes step 53 to return. Otherwise, step 108 proceeds to step 94. Step 94 gets selection results between the client 22 and each of the servers 23 in the selection list 13, i.e., the prcmd( ) routine 11 checks the status of the connection between the client 22 and each of the one or more servers 23 on the selection list 13. Step 95 directs the prcmd( ) routine 11 to the beginning of the array of structures 40. Step 96 determines whether the prcmd( ) routine 11 is at the end of the array of structures 40. If not, step 96 proceeds to step 97, which accesses a server structure 30 of the array of structures 40. Step 98 involves (1) analyzing the selection result between the client 22 and the server associated with the accessed server structure 30 if the server identifier is on the selection list 13, and (2) updating the status variable 32 of the accessed server structure 30 if the selection result indicates that the connection state has been advanced. Step 99 goes to the next server structure 30 in the array of structures 40. When step 96 determines that the prcmd( ) routine 11 is at the end of the array of structures 40, step 53 returns and the prcmd( ) routine 11 completes.

It should be clear that steps 95–99 traverse each server structure of the array of structures 40 even though the net effect is to access only the server structures on the selection list. Alternatively, the selection list may be traversed so that server structures not on the selection list will not be considered. However, the preferred method uses steps 95–99, as shown, since these steps readily and efficiently provide access to the status variable 32 of the server structures 30 for updating.

Figure 12:
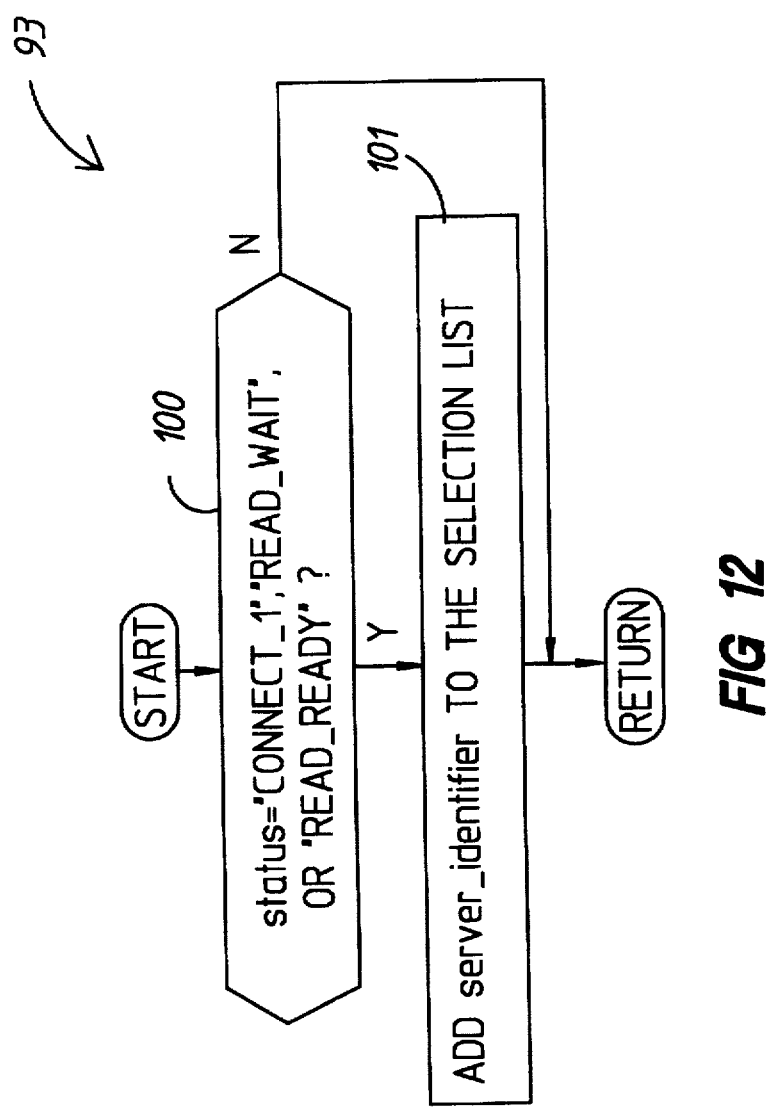
FIG. 12 is a flow diagram of the "update a selection list" step of FIG. 11 according to a first embodiment of the invention.

FIG. 12 shows a first embodiment of step 93 (FIG. 11). In the first embodiment, the prcmd( ) routine 11 communicates with a customized daemon running on the one or more servers 23. Step 100 determines whether the status variable 32 of the server structure 30 equals either the "CONNECT_1" state, the "READ_WAIT" state, or the "READ_READY" state. If so, the server identifier 31 of the server structure is added to the selection list 13. Otherwise, step 93 returns.

Figure 13:
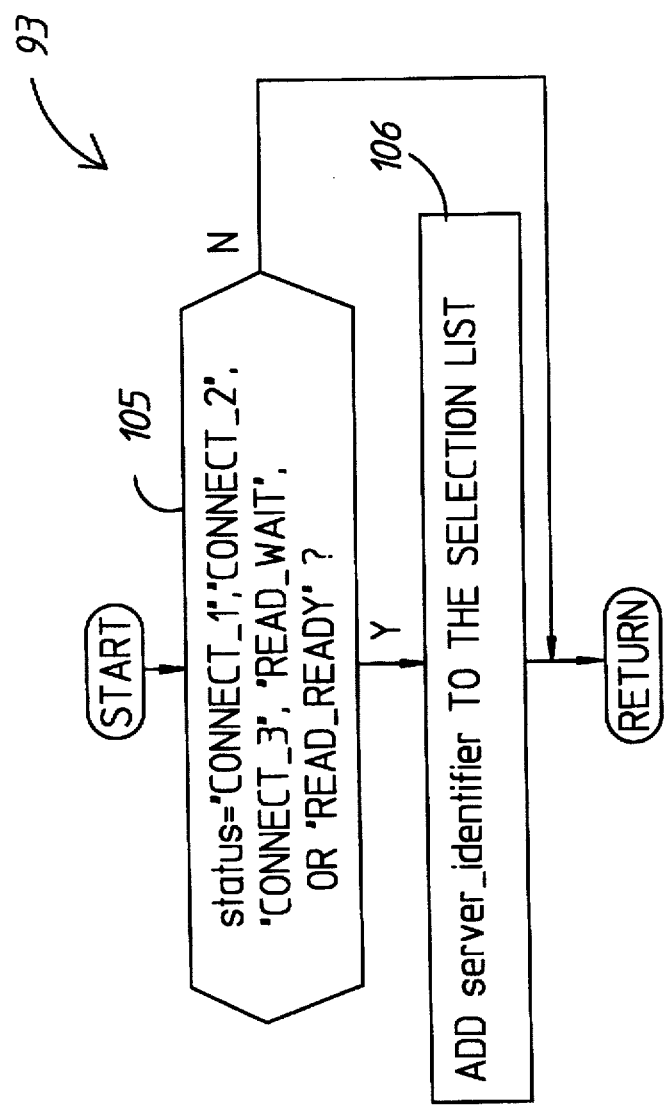
FIG. 13 is a flow diagram of the "update a selection list" step of FIG. 11 according to a second embodiment of the invention.

FIG. 13 shows a preferred second embodiment of step 93 (FIG. 11). In the preferred second embodiment, the prcmd( ) routine 11 communicates with the one or more servers 23 using the remsh protocol. In this case, a customized daemon is not necessary and the prcmd( ) routine 11 utilizes the server-side inetd daemon and remshd daemon that are presently provided with the UNIX operating system. Step 105 determines whether the status variable 32 of the server structure 30 equals either the "CONNECT_1" state, the "CONNECT_2" state, the "CONNECT_3" state, the "READ_WAIT" state, or the "READ_READY" state. If so, step 105 proceeds to step 106 which involves adding the server identifier 31 of the accessed server structure 30 to the selection list 13. Otherwise, step 105 simply causes step 93 to return.

Step 98 (FIG. 11) will now be discussed in further detail in connection with the first embodiment. First, step 98 invokes a routine according to the value of the status variable 32 of the accessed server structure 30. FIG. 14 shows a switch statement written in the C programming language that determines which routine to invoke. If the status variable 32 equals the "CONNECT_1" state, step 98 proceeds to the connect1_routine( ) 110. If the status variable 32 equals the "READ_WAIT" state, step 98 calls the read_wait_routine( ) 114. If the status variable 32 equals the "READ_READY" state, step 98 calls the read_ready_routine( ) 115.

Figure 16:
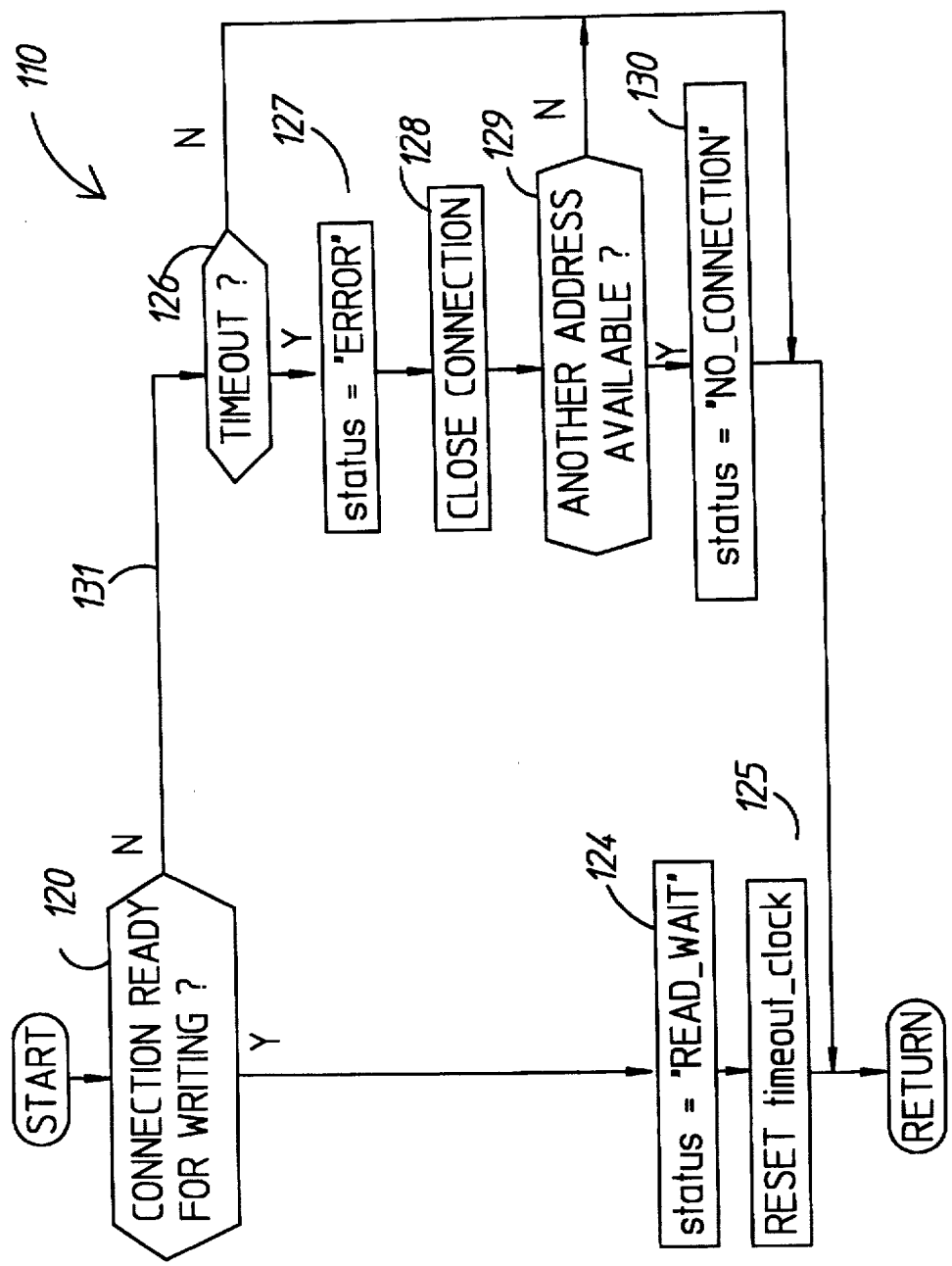
FIG. 16 is a flow diagram of the connect1_routine( ) of FIG. 14 according to the first embodiment of the invention.

The connect1_routine( ) 110 (FIG. 14) is shown in FIG. 16, and will now be discussed in detail. Step 120 determines whether the connection between the client 22 and the one of the servers 23 is ready for writing. If so, step 120 proceeds to step 124. Step 124 sets the status variable 32 of the server structure 30 equal to the "READ_WAIT" state. Step 125 resets the timeout_clock 33 of the server structure 30. If step 120 determines that the connection between the client and the server is not ready for writing, step 120 proceeds to step 126, which determines whether a timeout condition has occurred by accessing the timeout_clock 33. If a timeout condition has not occurred, step 126 causes step 110 to return. Otherwise, step 127 sets the status variable 32 equal to the "ERROR" state. Step 128 closes the connection. Step 128 may close the connection by performing a close operation on the file descriptor fp1 35 of the server structure 30. Step 129 determines whether another address for the server is available. If so, the status variable 32 is set to the "NO_CONNECTION" state to indicate to the prcmd( ) routine 11 to attempt to establish a new connection between the client and the server upon the next invocation of the prcmd( ) routine 11. If another address is not available, step 129 causes step 110 to return.

Figure 20:
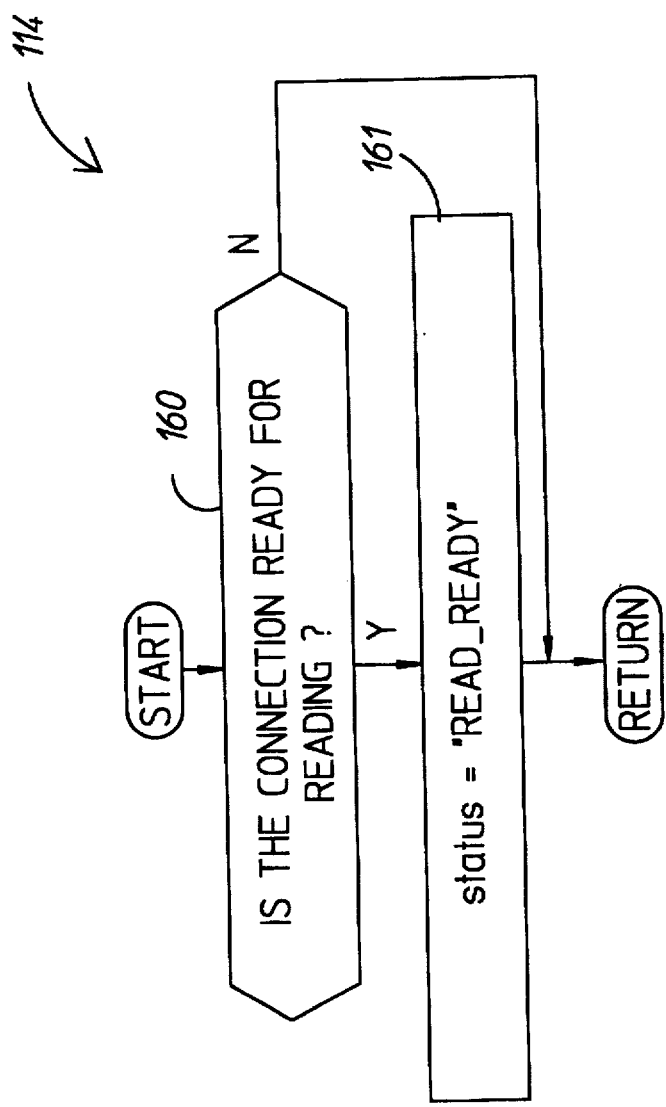
FIG. 20 is a flow diagram of the read_wait_routine( ) of either FIG. 14 according to the first embodiment of the invention FIG. 15 according to the second embodiment of the invention.

The read_wait_routine( ) 114 (FIG. 14) is shown in detail in FIG. 20. Step 160 determines whether the connection is ready for reading. If not, step 160 causes step 114 to return. If the connection is ready for reading, step 160 proceeds to step 161, which sets the status variable 32 of the server structure 30 equal to the "READ_READY" state.

Figure 21:
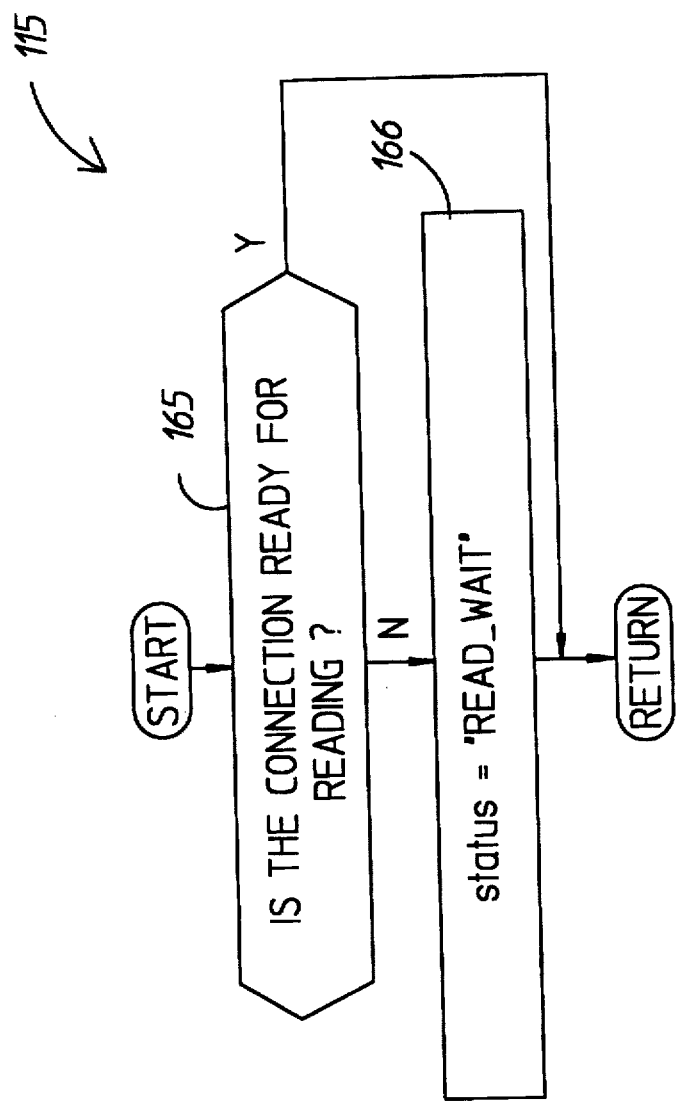
FIG. 21 is a flow diagram of the read_ready_routine( ) of either FIG. 14 according to the first embodiment of the invention or FIG. 15 according to the second embodiment of the invention.

The read_ready_routine( ) 115 (FIG. 14) is shown in detail in FIG. 21. Step 165 determines whether the connection is ready for reading. If so, step 165 causes step 115 to return. Otherwise, step 165 proceeds to step 166 which sets the status variable 32 of the server structure 30 equal to the "READ_WAIT" state.

In the preferred second embodiment, step 98 (FIG. 11) determines which routine to call according to the status variable 32 of the server structure 30. FIG. 15 shows a switch statement written in the C programming language that determines which routine to call. If the status variable 32 equals the "CONNECT_1" state, step 98 calls the connect_1( ) routine 111. If the status variable 32 equals the "CONNECT_2" state, step 98 calls the connect2_routine( ) 112. If the status variable 32 equals the "CONNECT_3" state, step 98 calls the connect3_routine( ) 113. If the status variable 32 equals the "READ_WAIT" state, step 98 calls the read_wait_routine( ) 114. If the status variable 32 equals the "READ_READY" state, step 98 calls the read_ready_routine( ) 115. It should be clear from a comparison of FIG. 14 with FIG. 15, that the preferred second embodiment of step 98 differs from the first embodiment of step 98 by including the connect2_routine( ) 112 and the connect3_routine( ) 113. Furthermore, the connect1_routine( ) 110 is replaced with the connect1_routine( ) 111. The modifications and additions accommodate the remsh protocol, so that the prcmd( ) routine 11 may connect with a server utilizing the inetd daemon and the remshd daemon. This provides the benefit of not requiring the user to write a daemon for the server, as well as offering the additional benefits of using a standard service which provides access control, command line shell interpretation, and a standard error port.

Figure 17:
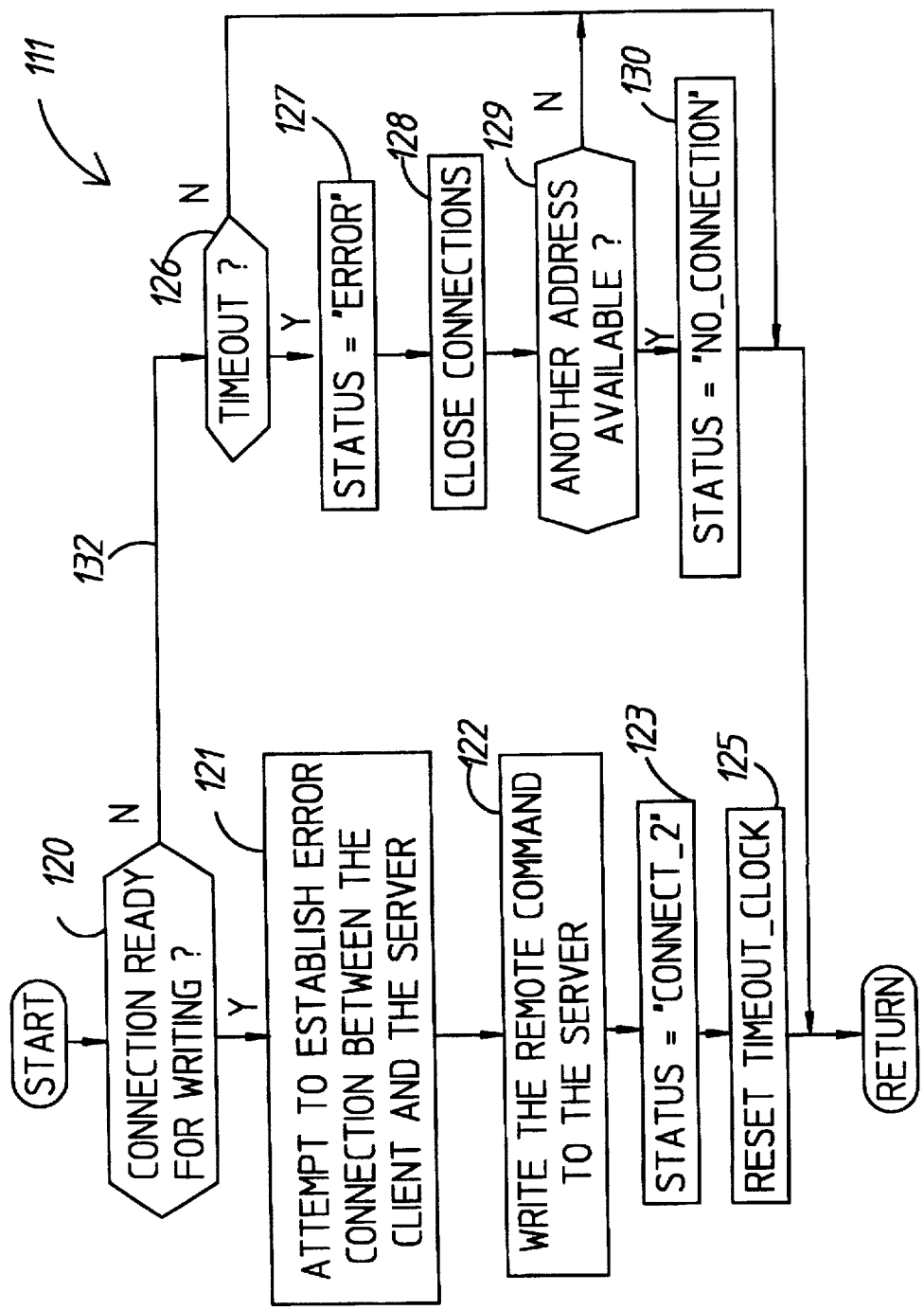
FIG. 17 is a flow diagram of the connect1_routine( ) of FIG. 15 according to the second embodiment of the invention.

FIG. 17 shows the connect1_routine( ) 111 (FIG. 15) for the preferred second embodiment. The timeout branch 132 for the connect1_routine( ) 111 is the same as the timeout branch 131 for the connect1_routine( ) 110 (compare FIG. 17 with FIG. 16), except that both connections associated with fp1 35 and fp2 36 are closed, and will not be discussed further. If step 120 determines that the connection between the client 22 and the server is not ready for writing, step 120 will proceed to the timeout branch 132. Otherwise, step 120 will proceed to step 121. Step 121 attempts to establish an error connection between the client 22 and the server. Step 122 writes standard access control information and the remote command indicated by the port_or_command pointer 34 of the server structure 30. Step 123 sets the status variable 32 equal to the "CONNECT_2" state. Step 125 resets the timeout_clock 33 of the server structure 30.

Figure 18:
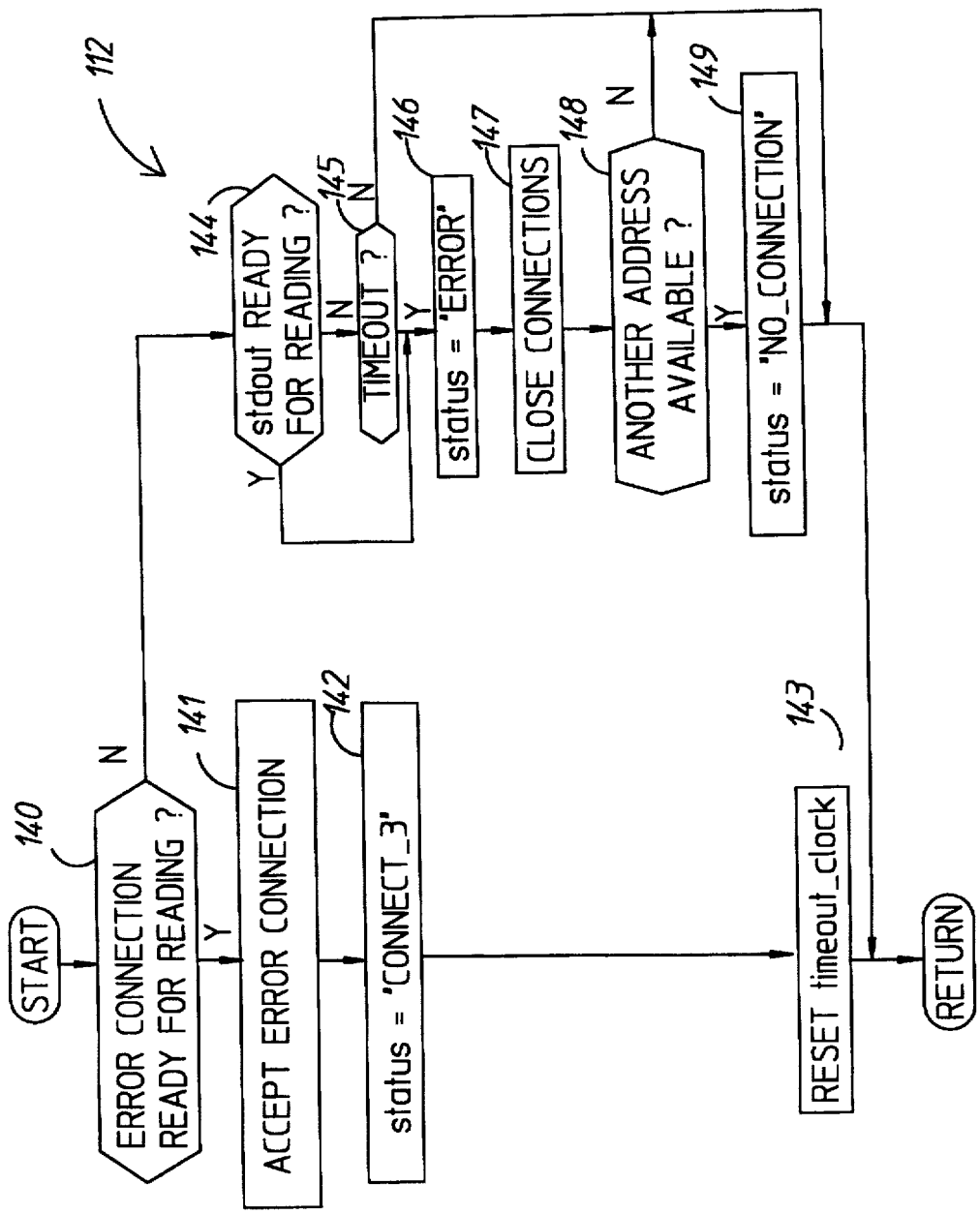
FIG. 18 is a flow diagram of the connect2_routine( ) of FIG. 15 according to the second embodiment of the invention.

The connect2_routine( ) 112 (FIG. 15) is shown in FIG. 18. Step 140 determines whether the error connection is ready for reading. If so, step 141 accepts the error connection. Step 141 may be implemented using the accept( ) routine provided by the UNIX operating system. Step 141 additionally involves storing a file pointer to the error stream in file pointer fp2 36 of the server structure 30 for access by the calling program 12 (see FIGS. 3 and 4). Step 142 sets the status variable 32 of the server structure 30 equal to the "CONNECT_3" state. Step 143 resets the timeout_clock 33 of the server structure 30. If step 140 determines that the error connection is not ready for reading, step 144 determines whether fp1 35 is ready for reading. If fp1 35 is ready for reading, which means that the remshd daemon returned an error message, step 144 proceeds to step 146, which sets the status variable 32 of the server structure 30 equal to the "ERROR" state. If fp1 35 is not ready for reading, step 145 determines whether a timeout condition has occurred. If a timeout condition has not occurred, step 145 causes step 112 to return. Otherwise, step 145 proceeds to step 146. In step 146, the status variable 32 is set equal to the "ERROR" state. Step 147 closes the connections. Step 148 determines whether another address for the server is available. If not, step 148 causes step 112 to return. Otherwise, step 148 proceeds to step 149 which sets the status variable 32 equal to the "NO_CONNECTION" state.

Figure 19:
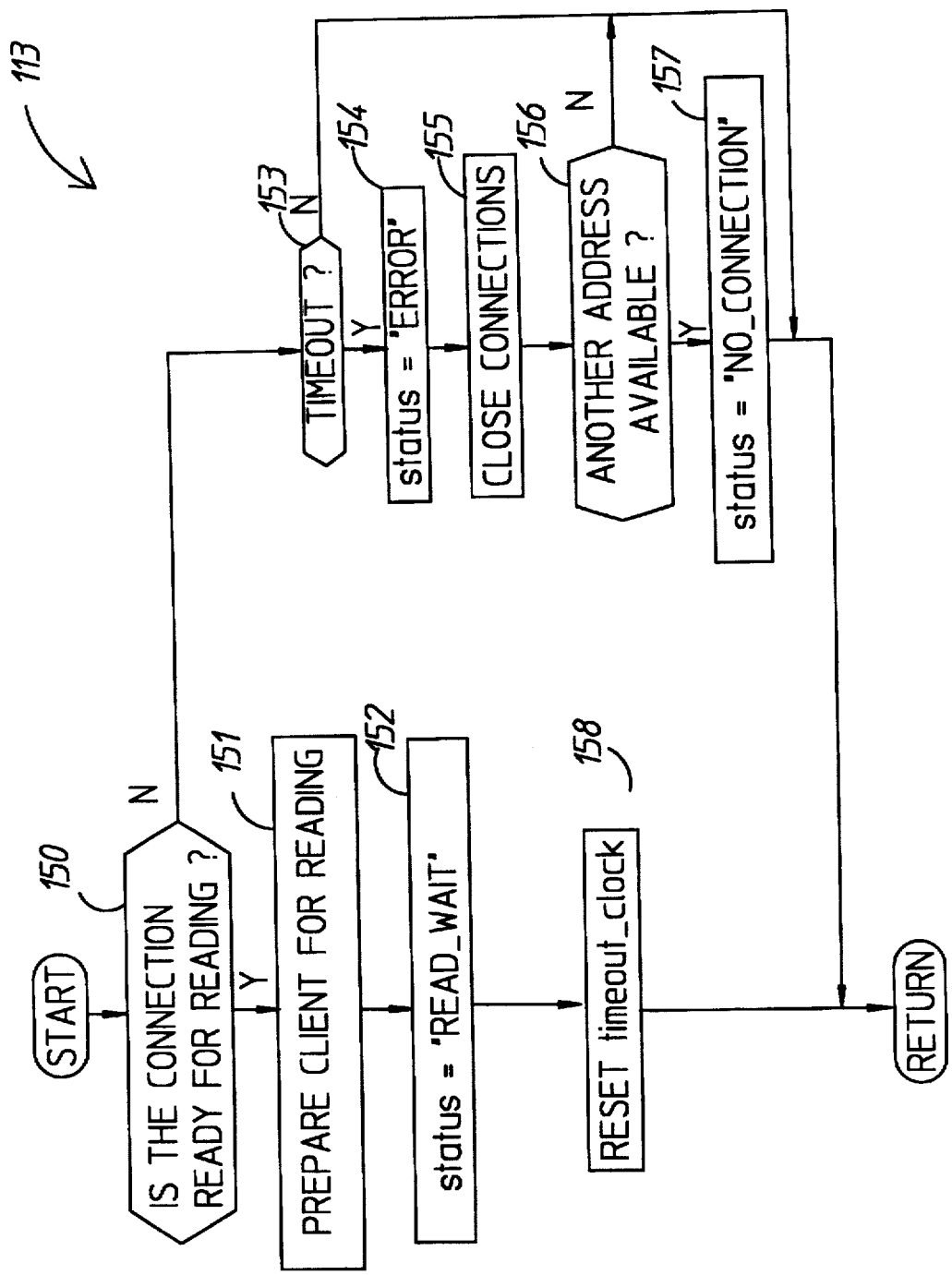
FIG. 19 is a flow diagram of the connect3_routine( ) of FIG. 15 according to the second embodiment of the invention.

FIG. 19 shows the connect3_routine( ) 113 (FIG. 15). Step 150 determines whether the connection is ready for reading. If so, step 151 prepares the client 22 for reading. For instance, the remsh protocol sends a null byte back to the client 22 before sending the data stream. Step 151 may include the step of consuming the null byte (i.e., reading and deleting the null byte), or alternatively, determining whether the first byte is the null byte, and if not, setting the status variable 32 to the "ERROR" state to indicate a remshd daemon failure and causing step 113 to return. Step 152 sets the status variable 32 equal to the "READ_WAIT" state. Step 158 resets the timeout_clock 33. If the connection is not ready for reading, step 150 proceeds to step 153, which determines whether a timeout condition has occurred. If not, step 153 causes step 113 to return. Otherwise, step 153 proceeds to step 154. Step 154 sets the status variable 32 equal to the "ERROR" state. Step 155 closes the connections. Step 156 determines whether another address for the server is available. If another address is not available, step 156 causes step 113 to return. Otherwise, step 156 proceeds to step 157 which sets the status variable 32 equal to the "NO_CONNECTION" state.

The read_wait_routine( ) 114 and the read_ready_routine( ) 115 for the preferred second embodiment are shown in FIG. 20 and FIG. 21, respectively, and described above. Both of these routines are the same as for the first embodiment.

Note that the calling program 12 can continue to call the prcmd( ) routine 11 to moderate any ensuing conversation with the remote command or custom daemon on a specific server.

Numerous enhancements are anticipated and intended to be within the scope of the invention. For example, the step of resetting the timeout_clock 33 of server structure 30 may involve simply copying the current time of the client 22 into the timeout_clock 33. Then, in the step of determining whether a timeout condition has occurred, the current time of the client 22 may be compared with the previously stored current time in the timeout_clock 33. If the difference between the current time presently indicated by the client 22, and the previously stored current time in the timeout_clock 33 is greater than a predetermined threshold, for example 30 seconds, the prcmd( ) routine 11 concludes that a timeout condition has occurred. If the difference is less than or equal to the predetermined threshold, the prcmd( ) routine 11 determines that a timeout condition has not occurred.

Additionally, the timeout interval may be settable by the calling program 12.

Additionally, the prcmd( ) routine 11 may include more robust error indication features. For instance, the step of setting the status variable 32 equal to the "ERROR" state, after determining that a timeout condition has occurred, may be replaced with a step of setting the status variable 32 equal to a "TIMEOUT_ERROR" state. Furthermore, if step 144 (see FIG. 18) determines that stdout is ready for reading, step 144 may proceed to an independent step of setting the status variable 32 equal to a "REMSHD_ERROR" state and recording the error message from remshd. Accordingly, the use of more detailed error states enables the calling program to better identify where problems are occurring.

Also, the server_identifier 31 of the server structure 30 is a pointer to a character string. However, this pointer may be substituted with a character string to remove a level of indirection. Similarly, the port_or_command pointer 34 may be substituted with either a value or a character string for the first embodiment and the second embodiment, respectively, to remove a level of indirection.

Additionally, the prcmd( ) routine 11, in a preferred embodiment, is written in the C programming language. However, the prcmd( ) routine 11 may be implemented using other languages, such as FORTRAN or PASCAL, or even using an object-oriented language, such as C++ or ADA.

The prcmd( ) routine 11, as described above, is implemented using BSD sockets. Alternatively, the prcmd( ) routine 11 may be implemented using any connection protocol that uses a connection mechanism, such as Distributed Computing Environment (DCE) services.

Additionally, the prcmd( ) routine 11 may, upon detecting an error between the client and a particular server, immediately attempt to establish another connection to the server rather than merely setting the status variable 32 of the associated server structure 30 equal to the "NO_CONNECTION" state (e.g., see step 130 in FIGS. 16 and 17). The prcmd( ) routine 11 should verify that there is at least one additional untried Internet address available for the server before immediately attempting to reestablish another connection.

Additionally, it should be clear that some of the steps that occur serially may be performed in a different order. For example, steps 76-78 on FIG. 7 may be performed in a different order and still achieve the same operation.

The second embodiment of the prcmd( ) routine 11 requires the use of reserve ports to support the remshd protocol. However, the first embodiment does not require using the reserve ports since the first embodiment converses with customized server-side daemons.

The prcmd( ) routine 11, in the second embodiment, includes the sending of access control information as required by the remshd protocol. Although the first embodiment is not required to implement similar control checks offered by the remsh protocol, the first embodiment may implement the control checks if they are desired. For instance, the use of control checks may be particularly important when network security is at issue.

Furthermore, the remshd protocol provides an error connection feature. In particular, the remsh daemon running on the server typically establishes an error connection from the server back to the client. However, according to the remsh protocol, the remsh daemon may be instructed not to establish the error connection when a null port number is received from the client. This provides the option of not using the error connection feature. The second embodiment of the invention may permit the calling program to disable the error connection feature using a function parameter to indicate to the prcmd( ) routine 11 that the error connection is not desired. In this situation, the file descriptor fp2 36 is unnecessary. Accordingly, the file descriptor fp2 36 is optional.

Additionally, the prcmd( ) routine 11 may be enhanced by adding a feature that detects timeouts that occur during ensuing conversations between the calling program 12 and the remote command or custom daemons on the one or more servers 23.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A method for establishing and managing a connection between a client computer system and each of a plurality of server computer systems, the method comprising the steps of:

A. providing a plurality of server system data structures, each of the plurality of server system data structures being associated with one of the plurality of server computer systems and having a status indicator that stores a value indicative of a connection state existing between the client computer system and the associated one of the plurality of server computer systems;

B. attempting, for each of the plurality of server system data structures having a status indicator that stores a value indicative of no connection, to establish a connection between the client computer system and the associated one of the plurality of server computer systems; and C. attempting, for each of the plurality of server system data structures having a status indicator that stores a value indicative of an established connection existing between the client computer system and the associated one of the plurality of server computer systems, to advance the connection state between the client computer system and the associated one of the plurality of server computer systems, and updating the status indicator if the connection state between the client computer system and the associated one of the plurality of server computer systems is advanced.

2. The method of claim 1, wherein step B includes the step of:

updating, for each of the plurality of server system data structures having a status indicator that stores a value indicative of no connection, the status indicator to store a value indicative of an established connection when a connection is established.

3. The method of claim 2, wherein step C includes the steps of:

selecting, for each of the plurality of server system data structures having a status indicator that stores a value indicative of the established connection, one of a plurality of advancement activities according to the value stored in the status indicator and executing the selected advancement activities.

4. The method of claim 3, further including the step of:

reattempting, when an error occurs in the connection between the client computer system and one of the plurality of server computer systems, to establish a new connection between the client computer system and the one of the plurality of server computer systems.

5. The method of claim 3, wherein step B further includes the step of:

attempting, for each of the plurality of server system data structures having a status indicator that stores a value indicative of no connection, to invoke a response by a remsh daemon running on the associated one of the plurality of server computer systems.

6. The method of claim 3, wherein each of the plurality of server system data structures further includes a remote command, and wherein at least one of the plurality of advancement activities includes the step of:

sending the remote command to the associated one of the plurality of server computer systems.

7. The method of claim 3, wherein at least one of the plurality of advancement activities includes the step of:

accepting an error connection established between the client computer system and the associated one of the plurality of server computer systems.

8. The method of claim 3, wherein each of the plurality of server system data structures further includes a timeout clock, and wherein at least one of the plurality of advancement activities includes the step of:

resetting the timeout clock of one of the plurality of server system data structures if the connection state between the client computer system and the server computer system associated with the one of the plurality of server system data structures is advanced.

9. The method of claim 1, wherein each of the plurality of server system data structures further includes a close indicator, and the method further includes the step of:

closing, for each of the plurality of server system data structures having a close indicator storing a value indicative of a close request, the connection between the client computer system and the associated one of the plurality of server computer systems.

10. The method of claim 1, wherein both steps B and C include non-blocking system calls.

11. The method of claim 1, wherein step B includes the step of:

attempting, for each of the plurality of server system data structures having a status indicator that stores a value indicative of no connection, to establish a connection between the client computer system and the associated one of the plurality of server computer systems only when sufficient resources exist on the client computer system.

12. A method for establishing and managing a connection between a client computer system and a server computer system, the method comprising the steps of:

A. providing a server system data structure having a status indicator that stores a value indicative of a connection state existing between the client computer system and the server computer system;

B. attempting to establish a connection between the client computer system and the server computer system when the status indicator stores a value indicative of no connection; and C. attempting, when the status indicator stores a value indicative of an established connection existing between the client computer system and the server computer system, to advance the connection state between the client computer system and the server computer system, and updating the status indicator if the connection state between the client computer system and the server computer system is advanced.

13. An apparatus for establishing and managing a connection to each of a plurality of server computer systems in a computer network, comprising:

an electronic digital computer including a processor, a memory and a network interface, the computer functioning as a client computer system and further including means for providing a plurality of server system data structures, each of the plurality of server system data structures being associated with one of the plurality of server computer systems and having a status indicator that stores a value indicative of a connection state existing between the client computer system and the associated one of the plurality of server computer systems;

means for attempting, for each of the plurality of server system data structures having a status indicator that stores a value indicative of no connection, to establish a connection between the client computer system and the associated one of the plurality of server computer systems; and means for attempting, for each of the plurality of server system data structures having a status indicator that stores a value indicative of an established connection existing between the client computer system and the associated one of the plurality of server computer systems, to advance the connection state between the client computer system and the associated one of the plurality of server computer systems, and updating the status indicator if the connection state between the client computer system and the associated one of the plurality of server computer systems is advanced.

14. The apparatus of claim 13, wherein the means for attempting to establish includes:

means for updating, for each of the plurality of server system data structures having a status indicator that stores a value indicative of no connection, the status indicator to store a value indicative of an established connection when a connection is established.

15. The apparatus of claim 14, wherein the means for attempting and updating includes:

means for selecting, for each of the plurality of server system data structures having a status indicator that stores a value indicative of the established connection, one of a plurality of advancement activities according to the value stored in the status indicator; and means for executing the selected advancement activities.

16. The apparatus of claim 15, wherein each of the plurality of server system data structures further includes a pointer to a collection of server computer system addresses, and wherein at least one of the plurality of advancement activities includes:

a function that attempts, when an error occurs in the connection between the client computer system and one of the plurality of server computer systems, to establish a new connection between the client computer system and the one of the plurality of server computer systems if one of the collection of server computer system addresses is untried.

17. The apparatus of claim 15, wherein the means for attempting to establish further includes:

means for attempting, for each of the plurality of server system data structures having a status indicator that stores a value indicative of no connection, to invoke a response by a remsh daemon running on the associated one of the plurality of server computer systems.

18. The apparatus of claim 15, wherein each of the plurality of server system data structures further includes a remote command, and wherein at least one of the plurality of advancement activities includes:

a function that sends the remote command to the associated one of the plurality of server computer systems.

19. The apparatus of claim 15, wherein at least one of the plurality of advancement activities includes:

a function that accepts an error connection established between the client computer system and the associated one of the plurality of server computer systems.

20. The apparatus of claim 15, wherein each of the plurality of server system data structures further includes a timeout clock, and wherein at least one of the plurality of advancement activities includes:

a function that resets the timeout clock of one of the plurality of server system data structures if the connection state between the client computer system and the server computer system associated with the one of the plurality of server system data structures is advanced.

21. The apparatus of claim 13, wherein each of the plurality of server system data structures further includes a close indicator, and the apparatus further includes:

means for closing, for each of the plurality of server system data structures having a close indicator storing a value indicative of a close request, the connection between the client computer system and the associated one of the plurality of server computer systems.

22. The apparatus of claim 13, wherein both the means for attempting to establish and the means for attempting and updating include non-blocking system calls.

23. The apparatus of claim 13, wherein the means for attempting to establish a connection includes:

means for attempting, for each of the plurality of server system data structures having a status indicator that stores a value indicative of no connection, to establish a connection between the client computer system and the associated one of the plurality of server computer systems only when sufficient resources exist on the client computer system.

24. An apparatus for establishing and managing a connection to a server computer system in a computer network, comprising:

an electronic digital computer including a processor, a memory and a network interface, the computer functioning as a client computer system and further including means for providing a server system data structure having a status indicator that stores a value indicative of a connection state existing between the client computer system and the server computer system;

means for attempting to establish a connection between the client computer system and the server computer system when the status indicator stores a value indicative of no connection; and means for attempting, when the status indicator stores a value indicative of an existing connection between the client computer system and the server computer system, to advance the connection state between the client computer system and the server computer system, and updating the status indicator if the connection state between the client computer system and the server computer system is advanced.

25. The method of claim 1, wherein step B includes the steps of:

reading a status indicator of one of the plurality of server system data structures;

when the read status indicator indicates that no connection exists between the client computer system and the associated server computer system, establishing a network connection between the client computer system and the associated server computer system, and storing a value, in the status indicator of the one of the plurality of server system data structures, indicating that the network connection exists between the client computer system and the associated server computer system; and when the read status indicator indicates that the network connection already exists between the client computer system and the server computer system, maintaining the value, in the status indicator of the one of the plurality of server system data structures, indicating that the network connection exists between the client computer system and the associated server computer system.

26. The apparatus of claim 13, wherein the means for attempting to establish a connection includes:

means for reading a status indicator of one of the plurality of server system data structures; and when the read status indicator indicates that no connection exists between the client computer system and the associated server computer system, establishing a network connection between the client computer system and the associated server computer system, and storing a value, in the status indicator of the one of the plurality of server system data structures, indicating that the network connection exists between the client computer system and the associated server computer system; and when the read status indicator indicates that the network connection already exists between the client computer system and the server computer system, maintaining the value, in the status indicator of the one of the plurality of server system data structures, indicating that the network connection exists between the client computer system and the associated server computer system.

\* \* \* \* \*